(12) United States Patent
Childress et al.

(10) Patent No.: US 10,445,302 B2
(45) Date of Patent: Oct. 15, 2019

(54) LIMITING BLOCKCHAIN SIZE TO OPTIMIZE PERFORMANCE

(71) Applicant: International Business Machines Corporation, Armonk, NY (US)

(72) Inventors: Rhonda L. Childress, Austin, TX (US); Rahul Gupta, Austin, TX (US); David B. Kumhyr, Austin, TX (US); Maharaj Mukherjee, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 15/396,960

(22) Filed: Jan. 3, 2017

(65) Prior Publication Data

US 2018/0189333 A1 Jul. 5, 2018

(51) Int. Cl.
*G06F 16/22* (2019.01)
*G06F 16/27* (2019.01)
*H04L 9/32* (2006.01)
*G06F 16/21* (2019.01)

(52) U.S. Cl.
CPC ........ *G06F 16/217* (2019.01); *G06F 16/2219* (2019.01); *G06F 16/275* (2019.01); *H04L 9/3236* (2013.01); *H04L 9/3297* (2013.01); *H04L 2209/38* (2013.01)

(58) Field of Classification Search
CPC ........ G06F 17/30306; G06F 17/30958; G06F 17/30522; G06F 17/30377; G06F 17/30097; G06F 17/30109; G06F 17/30073; G06F 17/30082; G06F 17/30085; G06F 16/217
See application file for complete search history.

(56) References Cited

U.S. PATENT DOCUMENTS

| | | | | |
|---|---|---|---|---|
| 9,569,771 | B2 * | 2/2017 | Lesavich | G06F 17/30864 |
| 10,114,969 | B1 * | 10/2018 | Chaney | G06F 21/6218 |
| 2008/0071748 | A1 * | 3/2008 | Wroblewski | G06F 17/30448 |
| 2008/0276057 | A1 | 11/2008 | Hetzler | |
| 2011/0246503 | A1 * | 10/2011 | Bender | G06F 9/546 |
| | | | | 707/769 |
| 2013/0097377 | A1 * | 4/2013 | Satoyama | G06F 3/0605 |
| | | | | 711/114 |
| 2013/0282969 | A1 | 10/2013 | Gerhard et al. | |

(Continued)

FOREIGN PATENT DOCUMENTS

CN 105741095 A * 7/2016

OTHER PUBLICATIONS

Anonymously; Mechanism to Preserve Audit History Record for Insurance Claim using Blockchain Smart Contract Aug. 5, 2016.

(Continued)

*Primary Examiner* — James Trujillo
*Assistant Examiner* — Michal Lawrence Bogacki

(57) ABSTRACT

A blockchain may include various transactions which are identified and which require processing. The order of processing such transactions may be optimized by examining content of the transactions. One example operation may include one or more of identifying blockchain transactions, designating each of the blockchain transactions as an independent transaction type or a dependent transaction type, and determining an order to process the blockchain transactions based on the independent transaction type or the dependent transaction type.

15 Claims, 5 Drawing Sheets

(56) References Cited

U.S. PATENT DOCUMENTS

| | | | | |
|---|---|---|---|---|
| 2014/0223086 A1* | 8/2014 | Pavlov | ............... | G11C 11/5621 |
| | | | | 711/103 |
| 2015/0228004 A1 | 8/2015 | Bednarek et al. | | |
| 2016/0306554 A1* | 10/2016 | Li | ......................... | G06F 3/0604 |
| 2016/0330034 A1* | 11/2016 | Back | ..................... | G06Q 20/06 |
| 2017/0337534 A1* | 11/2017 | Goeringer | ............. | G06Q 20/02 |
| 2018/0024853 A1* | 1/2018 | Warfield | ............ | G06F 9/45558 |
| | | | | 718/1 |
| 2018/0096349 A1* | 4/2018 | McDonald | ......... | G06Q 20/3829 |
| 2018/0129700 A1* | 5/2018 | Naccache | ......... | G06F 17/30371 |
| 2018/0130050 A1* | 5/2018 | Taylor | ............... | G06Q 20/3674 |
| 2018/0189312 A1* | 7/2018 | Alas | ................. | G06F 17/30144 |

OTHER PUBLICATIONS

Anonymously; Method and Apparatus for Application Driven Blockchain Trust Selection System in Blockchain Fabric, Apr. 29, 2016.

* cited by examiner

350

LIMITING BLOCKCHAIN SIZE TO OPTIMIZE PERFORMANCE

TECHNICAL FIELD

This application relates to performance optimization and, more particularly, to limiting the size of a blockchain to optimize performance.

BACKGROUND

One feature of a blockchain is that it records each transaction in an open shared ledger. Unfortunately, this is sometimes a problem since each and every aspect of the transactions are recorded on a blockchain and thus the size of the blockchain in memory can become very large. Updating a blockchain is linearly proportional to its size. Thus, for each transaction, if the problem size is O(n) for a 'n' length block chain, the problem becomes $O(n^2)$. The size problem can grow based on a quadratic expression representing the size of the block chain. The size becomes enormously long very quickly in a domain of the Internet of Things (IoT) where all transactions occur between different machines. Machines can create transactional events at an enormous speed on the order of $10^6$ or more each second, based on the complexity of the system and the number of IoT devices. Since the blockchain is an open ledger that is updated and shared among all IoT devices, the length of the blockchain can adversely impact the performance of an IoT type of system.

Managing the length of a blockchain is a major issue for any implementation and application of blockchains whether it is a permission-less ledger or a needs-permission ledger. The problem is more prevalent to permission-less ledgers where the size is not under strict control.

SUMMARY

One example embodiment may include a method that comprises one or more of identifying a frequency of access of one or more portions of a blockchain, determining the one or more portions of the blockchain which are eligible for archiving based on the frequency of access of the one or more portions of the blockchain, and compressing and archiving the one or more portions of the blockchain eligible for archiving.

Another example embodiment may include an apparatus comprising a processor configured to perform one or more of identify a frequency of access of one or more portions of a blockchain, determine the one or more portions of the blockchain which are eligible for archiving based on the frequency of access of the one or more portions of the blockchain, and compress and archive the one or more portions of the blockchain eligible for archiving.

Still another example embodiment may include a non-transitory computer readable storage medium configured to store instructions that when executed cause a processor to perform one or more of identifying a frequency of access of one or more portions of a blockchain, determining the one or more portions of the blockchain which are eligible for archiving based on the frequency of access of the one or more portions of the blockchain, and compressing and archiving the one or more portions of the blockchain eligible for archiving.

DETAILED DESCRIPTION

Figure 1:
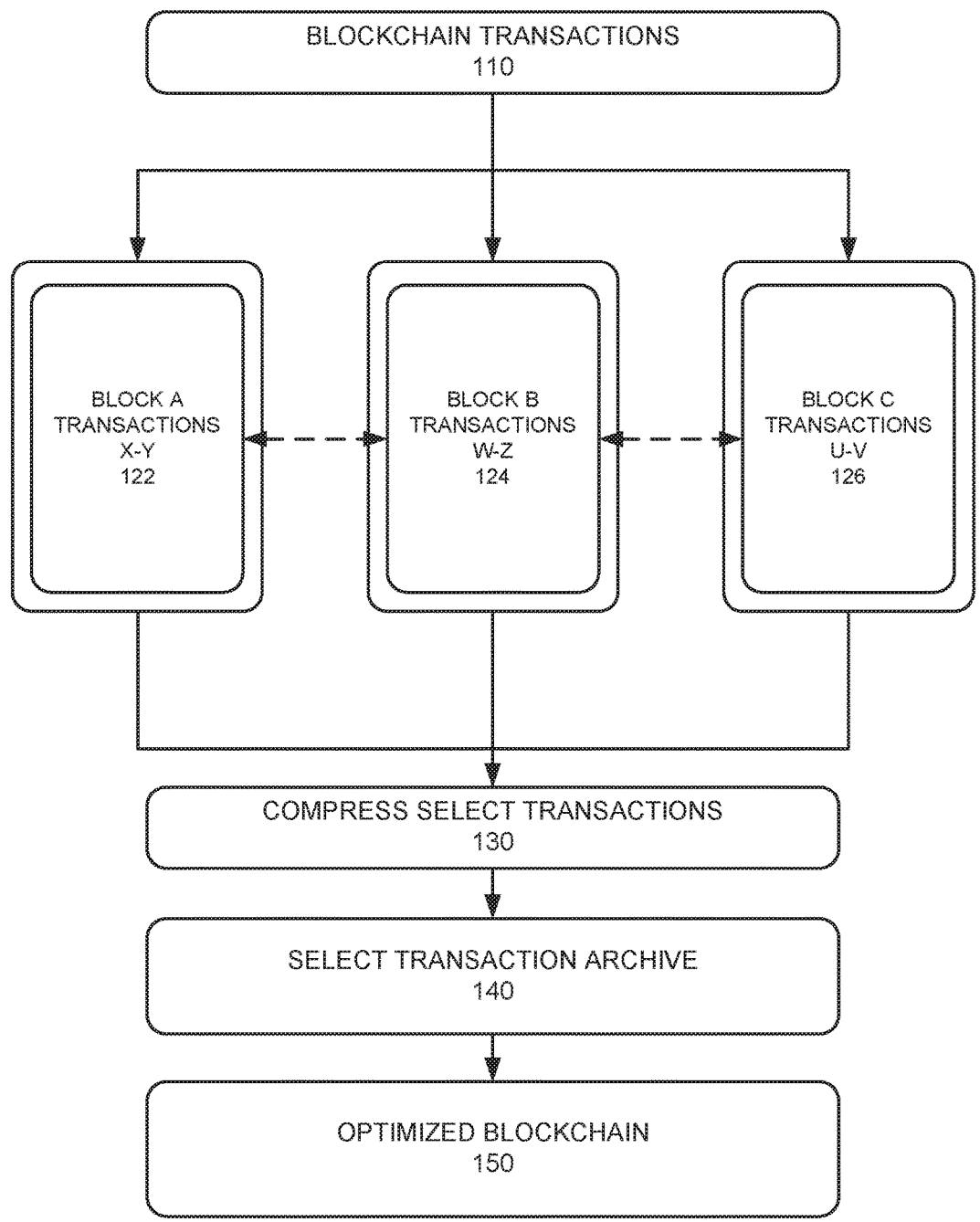
FIG. 1 illustrates a logic block diagram of a blockchain transaction tracking configuration according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

In one embodiment, blockchain management actions are taken when a blockchain size has exceeded a predetermined size. Both permission-less ledgers as well as permission-required ledgers may both utilize the blockchain optimization procedure described in the example embodiments. In an example, each block of a blockchain can be up to a certain size, such as 1 MB, but the size is still not fixed. Also, each block in such an example of blockchain, may contain a large number of transactions, such as 2,400 transactions). As transaction blocks are supposed to be found in various time frames, for example every ten minutes, this would yield 14,400 transactions per hour or four transactions per second. If more transactions are received they would compete for inclusion into the blocks. Transactions with smaller fees would gain priority by aging and would at some point be included at times of fewer transactions. Requirements of transactions arriving quickly would attach bigger transaction fees for faster inclusion. At some point, micro-transactions would cost more than the amount of value they represent and/or would have to be logged for long periods of time.

The current blockchain protocol would not be able to sustain a transaction volume of millions of transactions per minute. Many credit card companies process 150 million transactions per day, which equals about 100,000 transactions per minute. Some crypto-currency networks are averaging approximately 60,000 transactions per day, or about ⅙ of what the network can handle with the current block size limit. These networks could scale to more than 40,000 transactions per second. In such a case, the common users would probably not store the complete blockchain anymore, but only the unspent outputs or some other derivative without the entire history of the transactions. Clients do not store the entire blockchain. There are going to be historical transactions that do not have any coins or value associated with them. This would indicate that clients could purge a large portion of the database used to store the blockchain.

Example embodiments provide limiting blockchain length by selectively compressing and archiving selected portions of the blockchain in order to increase and maintain computational efficiency, maintain all transactions while keeping the length of the blockchain fixed and limiting its growth by determining least used sections of the blockchain and archiving those sections for later use, such that archived portions may be accessed and brought back in the original ledger if necessary.

FIG. 1 illustrates a logic block diagram of a blockchain transaction tracking configuration according to example embodiments. Referring to FIG. 1, the logic diagram 100 includes receiving blockchain transactions 110, and storing the transactions in appropriate blocks 122, 124, 126, etc. The transactions are logged and stored in a logging procedure associated with blockchain protocols. However, as the overall size of the blockchain grows, a threshold size may be reached at which point the transactions are organized and audited for certain transaction attributes, such as when the transaction was received and logged, how long the transaction has been stored in the blockchain, a time when the transaction was last accessed, how many times the transaction has been accessed over a period of time, etc. One or more transaction attributes may be used as the basis for selection, removal and archiving in memory.

The transactions may be compressed as they are removed from the optimized blockchain 150 and replaced with transaction metadata, such as source information, destination information, monetary information, etc., and other key attributes which are preserved to reference the transactions after they are removed and compressed. The compressed transactions 130 are then placed in an archive 140, such as a secure database for fast reference at a later time. The optimized blockchain 150 may have a record of all transactions, however, not all transactions may be stored in the optimized blockchain 150 since some have been removed and archived.

The size of a blockchain block depends on the standardization being used with that particular blockchain. The threshold size used to decide when to perform an archive operation can also be decided based on the speed or rate at which transactions are being accumulated. When the transaction/block growth rate slows beyond a speed at which the transaction is generated or created it may be time to initiate an archive operation otherwise the buffers may be full rather quickly. The archiving should be performed before an overfill condition occurs.

Archiving transactions which are related to a blockchain client that is part of the blockchain network may occur if the client dis-enrolls/deregisters from the blockchain network. The archived transactions may be brought back in the active ledger if the client joins back and re-registers with the network. Archiving least frequently used transactions may be performed responsive to when the blockchain reaches its limiting size. The transactions may be brought back in the ledger if needed at a later time. The examples disclosed will maintain all the transactions while keeping the length of the blockchain fixed. In general, the running length of the blockchain should be fixed. That helps estimate the size and the time required for each transaction. The size of the blockchain depends on the current standard (for example, 1 MB), however the size may grow as the technology changes for faster processors and larger memory. It is optimal to compress any transaction that is archived for longer storage.

Figure 2:
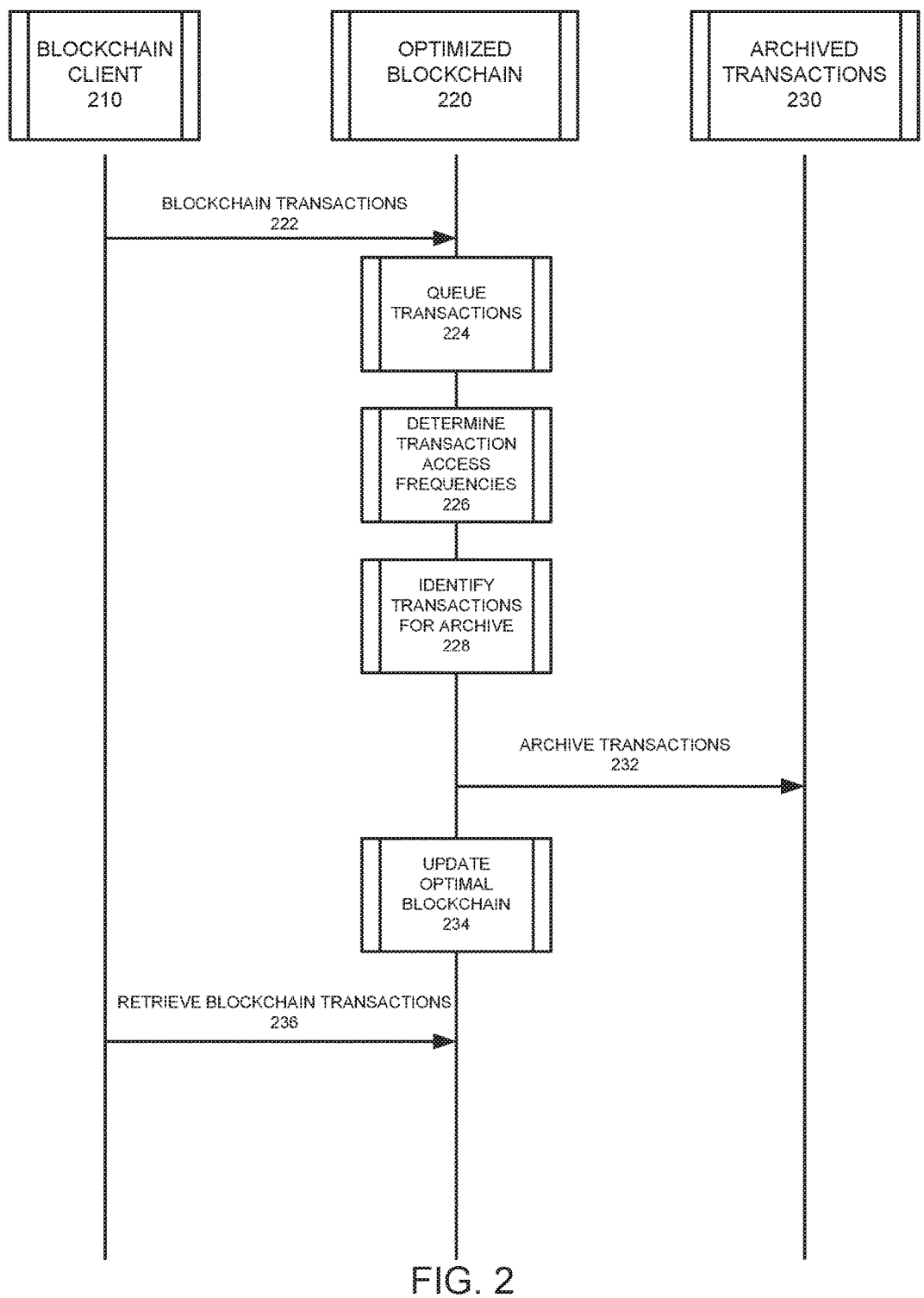
FIG. 2 illustrates a system signaling diagram of a blockchain transaction tracking configuration according to example embodiments.

FIG. 2 illustrates a system signaling diagram of a blockchain transaction tracking configuration according to example embodiments. Referring to FIG. 2, the system 200 includes a blockchain client 210 which operates as an independent entity seeking access to the blockchain to observe transactions, write transactions, etc. The optimized blockchain 220, which may be stored on the client 210 or another computer, may be the same as a regular blockchain. However, some transactions are normal and some are merely placeholders of actual transactions which are archived and compressed 230. In operation, the blockchain client 210 may forward transactions 222 to the blockchain 220 for storage in a blockchain block. The transactions may be queued 224 based on the time they arrive, and based on the frequency 226 of access by third parties, etc. The least accessed transactions and/or the oldest transactions may be stored at the top of the queue for easy selection and removal during a compression/archive operation.

The transaction access attempts may be logged and identified for each transaction. As the transactions are accessed the relative importance of the transaction increases. For example, if a transaction was accessed multiple times, each time it was accessed may have been recorded and used to weight the transaction as having a relative level of importance. An importance level transaction attribute that is higher than other transactions may be less likely to be archived. Also, a more recent access may take priority over a less recent access operation. For example, a transaction that was accessed in a current day may be moved further down the queue of transactions to ensure the transaction is not archived prematurely. Once one or more transactions are identified for archiving 228, the transactions may be archived 232 to a database to reduce the size of the optimized blockchain 220. The blockchain may be updated 234 to reflect the change(s). The optimized blockchain 220 can be accessed for retrieving various transactions 236 via the blockchain client 210. If a transaction is accessed that has been archived, then it may be retrieved from memory 230 and restored if necessary.

When an archived portion of the blockchain (i.e., one or more transactions) is needed, that portion is accessed and brought back to the original ledger. In one example, each transaction is maintained with a time stamp. The number of times each transaction is viewed, read, or written is maintained as an attribute to the transaction indicating its access frequency. Transactions are sorted in a priority queue so that the least frequent transactions are at the top of the queue, in one embodiment. When the blockchain reaches its limiting size then one or more of the least frequent transactions are archived. The archive can be stored in an encrypted loss-less compressed format and can be accessed whenever needed.

In another example, a group of neighboring sections of several transactions may be grouped together and moved-off the blockchain (i.e., compressed and archived). The size of the section can be fixed or varied depending on the demand and the age and usage of the transaction chains and where the truncated bits are store. For example, a group of 10 or more transactions may be identified as being from a seldom referenced source and may be grouped together as a candidate for compression and archiving. Another example is when one transaction initiated another transaction which in turn may have initiated one or more transactions and each transaction, in turn, may have initiated others. That set of transactions can all be related and grouped together. However, after some time these transactions may not have a need of use or view within the purview of the blockchain and may therefore be archived together until they are all needed together back again and then they can all be de-archived. The grouping of transactions can be decided by many factors. One example is the geo-location of the transaction or relationship to IoT devices.

In an alternative embodiment, the frequency of access attempts is used as a linear function based on the viewed, read, and written transactions, where each attribute is assigned a weight based on its significance within the blockchain that can be adjusted to make the block chain more efficient. For example, each time a transaction is viewed or read, the weight may be applied to increase the transaction's current status. Moving the transaction into a different position of the queue may be performed to reflect the change in the transaction's weight and status. For example, a transaction may be located at a higher part of a queue and when it is accessed it may move down the queue based on its applied attribute/weight. If that same transaction is again accessed, then it may be moved down even further by an amount commensurate with the weight.

In another embodiment, several related transactions may be archived together. The relationship between the transactions can be decided either by determining their connectivity such as origin or message passing to a group of IoT devices clustered together and/or networked together and based on their event timings. When one such transaction is taken and selected for archiving, all other related transactions are also taken out preemptively to reduce the archiving time. At the same time when one such transaction is taken out of the archive, all other related transactions are also taken out preemptively to reduce the de-archiving time.

Another example embodiment may include a least frequently used transaction or its related transactions can be archived based on those which are least commonly accessed. For example, a least commonly used transaction is determined by how many distinct IoT devices have accessed the transaction.

Yet in another embodiment, the frequencies of access and similar actions with regard to transactions stored in the blockchain may be identified and organized based on different groups. The groups may be further grouped based on the group access patterns. The access patterns are identified using a cognitive learning algorithm, where characteristics are learned and identified and stored in an access file. The blockchain can use pointers to access the transactions accordingly and based on the characteristics. Also, transactions related to a blockchain client which are part of the blockchain network could be archived if the client is identified as having unenrolled/deregistered from the blockchain network. When the client joins back and re-registers with the network, transactions could be brought back in the active ledger from the archive.

Figure 3A:
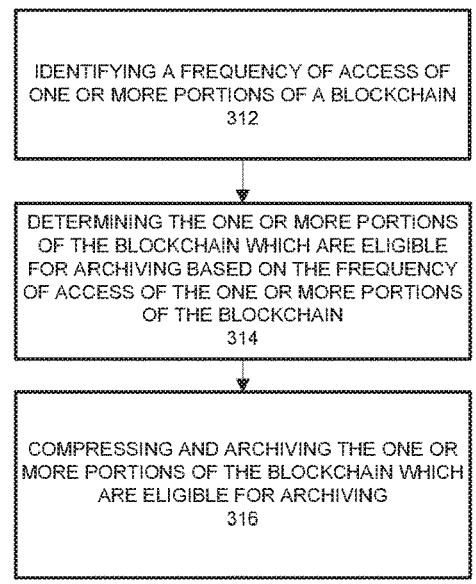
FIG. 3A illustrates a flow diagram of an example method of operation according to example embodiments.

FIG. 3A illustrates a flow diagram of an example method of operation according to example embodiments. Referring to FIG. 3A, the method 300 may include identifying a frequency of access of one or more portions of a blockchain 312, determining the one or more portions of the blockchain which are eligible for archiving based on the frequency of access of the one or more portions of the blockchain 314 and compressing and archiving the one or more portions of the blockchain eligible for archiving 316. The blocks/transactions/portions of the blockchain which are eligible for archiving may not be accessed frequently or at all. The importance of a transaction or other portion of the blockchain may render the transaction active and ineligible for compression and archiving.

The method may also include determining a maximum data size threshold of the blockchain, identifying a client profile has withdrawn enrollment from the blockchain, identifying a plurality of client profile transactions logged in the blockchain corresponding to the client profile, and archiving the plurality of client profile transactions corresponding to the client profile. The method may also include identifying the client profile has re-enrolled with the blockchain, identifying the plurality of client profile transactions corresponding to the client profile, and restoring the plurality of client profile transactions responsive to the client profile being re-enrolled with the blockchain. The method may further include determining the blockchain data stored in the blockchain has reached the maximum data size threshold, and responsive to determining the blockchain data has reached the maximum data size threshold, archiving least frequently accessed blockchain transactions. The method may also include storing blockchain transactions of the blockchain in a priority queue with the least frequently used transactions at respective topmost positions of the queue, and when the blockchain reaches the maximum data size threshold, archiving the least frequently accessed blockchain transactions at the respective topmost positions of the queue.

Figure 3B:
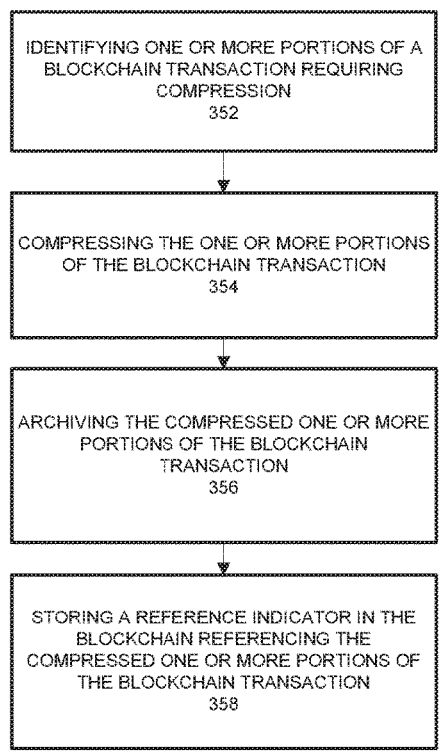
FIG. 3B illustrates a flow diagram of an example method of operation according to example embodiments.

FIG. 3B illustrates another flow diagram 350 of another example method of operation according to example embodiments. The method may include identifying one or more portions of a blockchain transaction requiring compression 352, compressing the one or more portions of the blockchain transaction 354, archiving the compressed one or more portions of the blockchain transaction 356, and storing a reference indicator in the blockchain referencing the compressed one or more portions of the blockchain transaction 358. In this example, as a transaction is identified as being linked to a large file size or file sizes, the transaction is separated from the files/content and written to the blockchain with a reference to a remote location where the files/content are stored. A large file, such as a video or other large file type may be referenced by the blockchain but not stored in the blockchain. Also, the large file(s) may be compressed and retrieved when needed during a transaction access operation.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
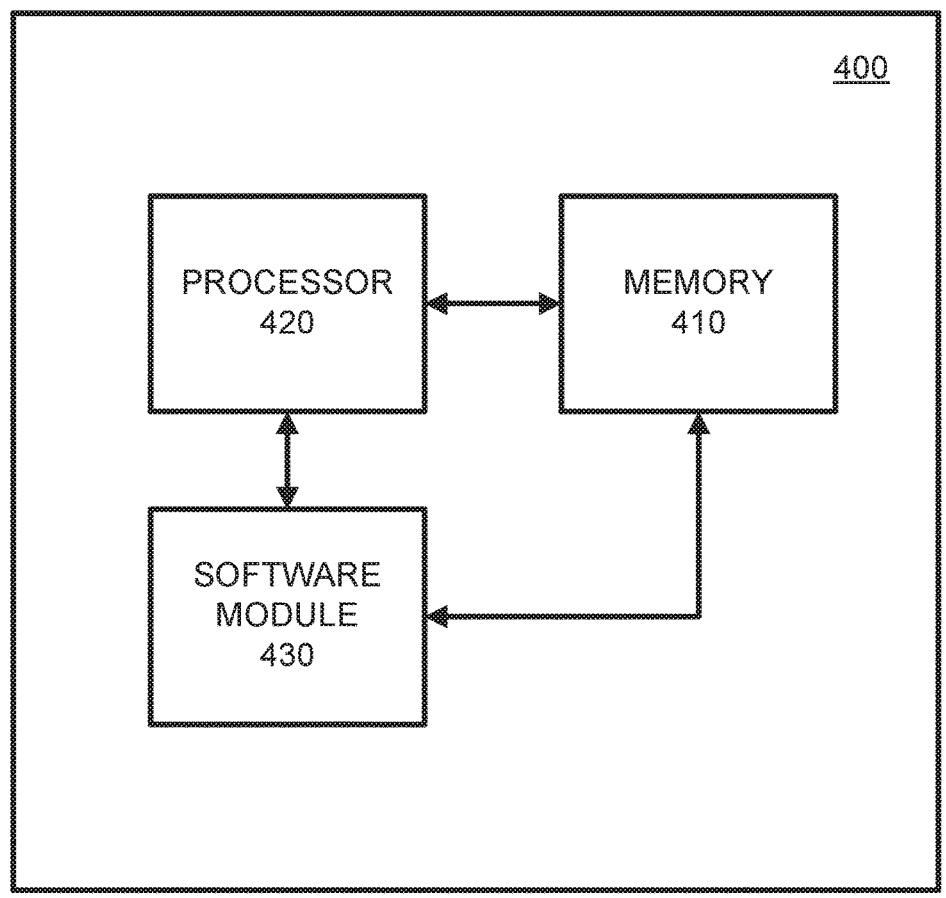
FIG. 4 illustrates an example network entity configured to support one or more of the example embodiments.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   determining a maximum data size threshold of a blockchain;
   determining that blockchain data stored in the blockchain has reached the maximum data size threshold;
   identifying a frequency of access of one or more transactions on a blockchain based on the determination that the blockchain has reached the maximum data size threshold;
   identifying at least one transaction, of the one or more transactions, as eligible for archiving based on the frequency of access of the at least one transaction;
   identifying, on the blockchain, at least one related transaction that is related to the identified at least one transaction portion; and compressing and archiving the at least one transaction and the at least one related transaction.

2. The method of claim 1, further comprising:
identifying a client profile has withdrawn enrollment from the blockchain; and
identifying a plurality of client profile transactions logged in the blockchain corresponding to the client profile.

3. The method of claim 2, further comprising archiving the plurality of client profile transactions corresponding to the client profile.

4. The method of claim 3, further comprising:
identifying the client profile has re-enrolled with the blockchain;
identifying the plurality of client profile transactions corresponding to the client profile; and
restoring the plurality of client profile transactions responsive to the client profile being re-enrolled with the blockchain.

5. The method of claim 1, further comprising:
storing blockchain transactions of the blockchain in a priority queue with the least frequently used transactions at respective topmost positions of the priority queue; and
when the blockchain reaches the maximum data size threshold, archiving the least frequently accessed blockchain transactions at the respective topmost positions of the priority queue.

6. An apparatus, comprising:
a processor configured to:
determine a maximum data size threshold of a blockchain;
determine that blockchain data stored in the blockchain has reached the maximum data size threshold;
identify a frequency of access of one or more transactions on a blockchain based on the determination that the blockchain has reached the maximum data size threshold;
identify at least one transaction, of the one or more transactions, as eligible for archiving based on the frequency of access of the at least one transaction;
identify at least one related transaction that is related to the identified at least one transaction portion; and
compress and archive at least one transaction and the at least one related transaction.

7. The apparatus of claim 6, wherein the processor is further configured to:
identify a client profile has withdrawn enrollment from the blockchain; and
identify a plurality of client profile transactions logged in the blockchain that correspond to the client profile.

8. The apparatus of claim 7, wherein the processor is further configured to archive the plurality of client profile transactions that correspond to the client profile.

9. The apparatus of claim 8, wherein the processor is further configured to:
identify the client profile has re-enrolled with the blockchain;
identify the plurality of client profile transactions that correspond to the client profile; and
restore the plurality of client profile transactions responsive to the client profile being re-enrolled with the blockchain.

10. The apparatus of claim 6, wherein the processor is further configured to:

store blockchain transactions of the blockchain in a priority queue with the least frequently used transactions at respective topmost positions of the priority queue; and
when the blockchain reaches the maximum data size threshold, archive the least frequently accessed blockchain transactions at the respective topmost positions of the priority queue.

11. A non-transitory computer readable storage medium configured to store at least one instruction that when executed by a processor causes the processor to perform:
determining a maximum data size threshold of a blockchain;
determining that blockchain data stored in the blockchain has reached the maximum data size threshold;
identifying a frequency of access of one or more transactions on a blockchain based on the determination that the blockchain has reached the maximum data size threshold;
identifying at least one transaction, of the one or more transactions, as eligible for archiving based on the frequency of access of the at least one transaction;
identifying, on the blockchain, at least one related transaction that is related to the identified at least one transaction portion; and
compressing and archiving the at least one transaction and the at least one related transaction.

12. The non-transitory computer readable storage medium of claim 11, configured to store at least one instruction that when executed by the processor causes the processor to perform:
identifying a client profile has withdrawn enrollment from the blockchain; and
identifying a plurality of client profile transactions logged in the blockchain corresponding to the client profile.

13. The non-transitory computer readable storage medium of claim 12, configured to store at least one instruction that when executed by the processor causes the processor to perform:
archiving the plurality of client profile transactions corresponding to the client profile.

14. The non-transitory computer readable storage medium of claim 13, configured to store at least one instruction that when executed by the processor causes the processor to perform:
identifying the client profile has re-enrolled with the blockchain;
identifying the plurality of client profile transactions corresponding to the client profile; and
restoring the plurality of client profile transactions responsive to the client profile being re-enrolled with the blockchain.

15. The non-transitory computer readable storage medium of claim 11, configured to store at least one instruction that when executed by the processor causes the processor to perform:
storing blockchain transactions of the blockchain in a priority queue with the least frequently used transactions at respective topmost positions of the priority queue; and
when the blockchain reaches the maximum data size threshold, archiving the least frequently accessed blockchain transactions at the respective topmost positions of the priority queue.

* * * * *